(12) United States Patent
Huening

(10) Patent No.: US 11,325,053 B2
(45) Date of Patent: May 10, 2022

(54) METHOD AND APPARATUS WITH OUTLET FOR EXTRACTING MOLTEN SALT

(71) Applicant: OSCHATZ ENERGY AND ENVIRONMENT GMBH, Essen (DE)

(72) Inventor: Herbert Huening, Raesfeld (DE)

(73) Assignee: CHRISTOF GLOBAL IMPACT LTD., London (GB)

(*) Notice: Subject to any disclaimer, the term of this patent is extended or adjusted under 35 U.S.C. 154(b) by 0 days.

(21) Appl. No.: 16/954,407

(22) PCT Filed: Dec. 21, 2018

(86) PCT No.: PCT/EP2018/086710
§ 371 (c)(1),
(2) Date: Jun. 23, 2020

(87) PCT Pub. No.: WO2019/129733
PCT Pub. Date: Jul. 4, 2019

(65) Prior Publication Data
US 2021/0077917 A1 Mar. 18, 2021

(30) Foreign Application Priority Data

Dec. 27, 2017 (EP) .................................... 17210753

(51) Int. Cl.
| | |
|---|---|
| *B01D 1/24* | (2006.01) |
| *B01D 1/00* | (2006.01) |
| *B01D 1/18* | (2006.01) |
| *B01D 9/00* | (2006.01) |
| *C02F 1/04* | (2006.01) |
| *C02F 1/08* | (2006.01) |

(Continued)

(52) U.S. Cl.
CPC ............. *B01D 1/24* (2013.01); *B01D 1/0047* (2013.01); *B01D 1/18* (2013.01); *B01D 9/0031* (2013.01); *C02F 1/042* (2013.01); *C02F 1/08* (2013.01); *C02F 1/265* (2013.01); *C02F 2001/5218* (2013.01)

(58) Field of Classification Search
None
See application file for complete search history.

(56) References Cited

U.S. PATENT DOCUMENTS

| | | | |
|---|---|---|---|
| 2,033,985 A | 3/1936 | Haney | |
| 2,876,182 A * | 3/1959 | Hopper | C01D 3/14 205/516 |
| 3,557,864 A | 1/1971 | Berg | |

(Continued)

FOREIGN PATENT DOCUMENTS

| | | |
|---|---|---|
| CA | 2094571 A | 4/1993 |
| EP | 0340616 A | 11/1989 |

*Primary Examiner* — Jonathan Miller
(74) *Attorney, Agent, or Firm* — Andrew Wilford

(57) ABSTRACT

The invention relates to a device for drawing off liquid salt, particularly for facilities for purifying wastewater, said device comprising a heating chamber. The heating chamber comprises an inlet for introducing a salt-containing substance and is connected to an outlet for a salt melt. The outlet comprises an outlet channel and an outlet channel end, a cooling region for cooling the salt melt being provided downstream of the outlet channel end. The outlet channel is peripherally surrounded by an outlet wall at least along a section, the outlet comprising a heating element.

15 Claims, 3 Drawing Sheets

(51) Int. Cl.
*C02F 1/26* (2006.01)
*C02F 1/52* (2006.01)

(56) References Cited

U.S. PATENT DOCUMENTS

| | | |
|---|---|---|
| 3,870,585 A | 3/1975 | Kearns |
| 4,042,318 A * | 8/1977 | Franke .................. C03C 21/001 432/210 |
| 9,927,176 B2 * | 3/2018 | Lopez Llorca ........... F28D 7/04 |
| 2011/0294083 A1 * | 12/2011 | Wiley .................... B01D 47/00 432/5 |

* cited by examiner

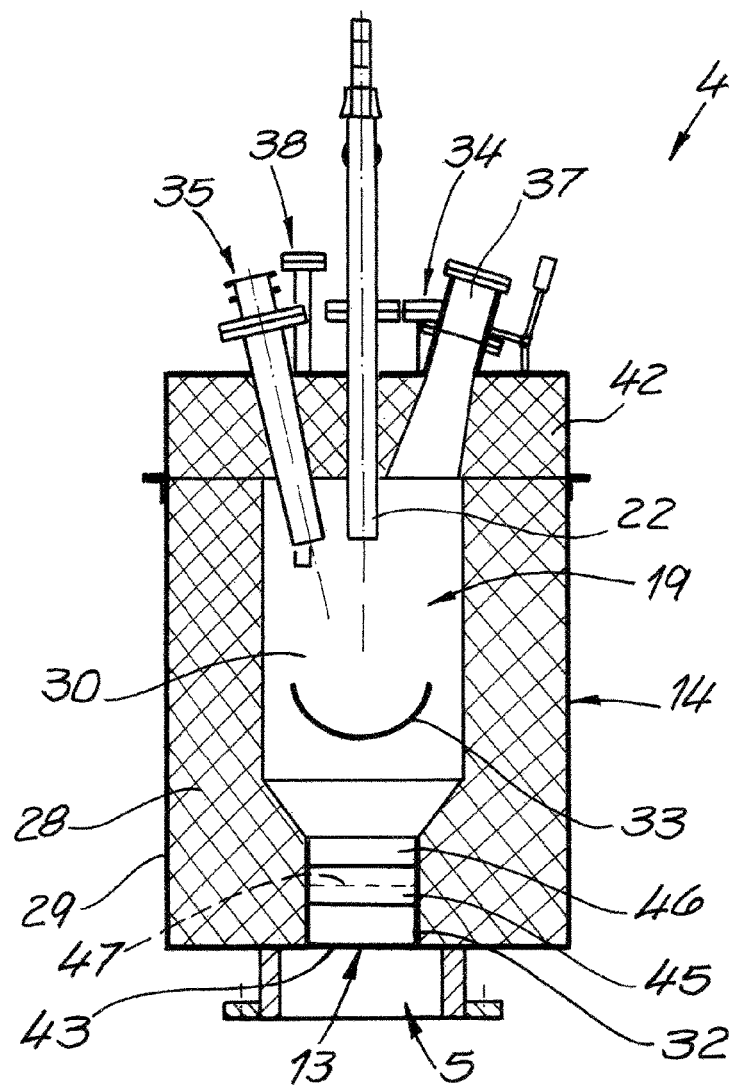
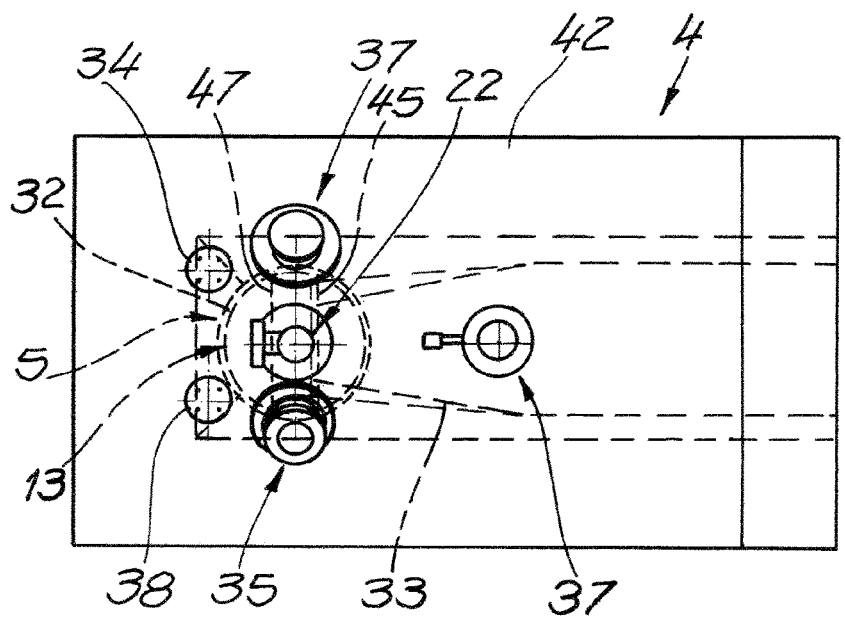

METHOD AND APPARATUS WITH OUTLET FOR EXTRACTING MOLTEN SALT

CROSS REFERENCE TO RELATED APPLICATIONS

This application is the US-national stage of PCT application PCT/EP2018/086710 filed 21 Dec. 2018 and claiming the priority of European patent application 17210753.4 itself filed 27 Dec. 2017.

FIELD OF THE INVENTION

The invention relates to an apparatus and method of extracting molten salt, particularly for wastewater purification plants, having a heating chamber that has an inlet for introduction of a saline substance and that is connected to an outlet for fused salt, the outlet having a passage with an end, a cooling station for cooling the fused salt being provided downstream of the passage end.

BACKGROUND OF THE INVENTION

EP 0 340 616 describes the above-described apparatus. A saline substance in the form of wastewater is introduced into a heating chamber where a temperature above the melting point of the contained salt prevails. The water content is thereby abruptly evaporated while the salt content is melted. By the abrupt evaporation, the water vapor entrains the molten salt in the form of a saline vapor. In a subsequent combustion process, combustible or organic and often environmentally harmful compounds are broken down into their individual elements for purification. The saline vapor condenses on the walls of the heating chamber and there forms molten salt. The molten salt then runs down into a sump equipped with an outlet. The outlet has a passage as well as an outlet end. The molten salt falls from the passage end into a moveable catchment vessel. Above the passage end, a hood along with a blower removes a gas mixture also leaving the outlet. Thus, the outlet is exposed to a continual flow of air resulting in the outlet becoming increasingly plugged due to salt deposits and needing to be cleaned on a regular basis. Hence, the known process results in substantial maintenance and low operational availability.

OBJECT OF THE INVENTION

Therefore, the object of the invention is to provide an apparatus and a method for extracting molten salt, with low maintenance and high operational availability. In particular, the object of the present invention is to prevent salt deposits around the outlet.

SUMMARY OF THE INVENTION

To attain the object, the invention teaches a[n apparatus] for extracting molten salt, particularly for wastewater purification plants, comprising a heating chamber that has an inlet for introduction of a saline substance and that is connected to an outlet for molten salt, the outlet having a passage and a passage end, a cooling station for cooling the molten salt being provided downstream of the passage end, the passage being peripherally enclosed along at least a section by an outlet wall having a heating element.

Advantageously, the heated outlet wall peripherally encloses the entire length of the passage. The term "travel" means in particular movement of the bulk material or the clump-bulk material mixture or solid substances. In contrast, movement of the molten salt is preferentially expressed as "flow." For example, the heating chamber is upstream of the outlet. For practical purposes, a conveyor is found downstream of the outlet. The term "passage" refers in particular to the empty space enclosed by the outlet wall. The term "heating element" refers in particular to that structural element used to keep the temperature in the outlet or passage above the melting temperature of the salt of the molten salt. For example, an air supply duct is conceivable as a heating element, with which hot air can be supplied to the passage. In addition, induction heaters or burners come into consideration as heating elements for example. The heating element is preferably a burner (outlet burner). It is appropriate for the outlet burner to project into the passage in such a manner that an outlet burner nozzle is enclosed at least partially by the outlet wall. It is advantageous if a tip of the outlet burner nozzle projects into the passage in such a manner that it is above the flowing molten salt and preferably above the passage end or a downstream end of the passage or a drop opening.

The invention is based on the discovery that particularly the passage end is especially problematic in regard to salt deposits. The invention is also based on the discovery that a flow of air through the outlet into the heating chamber further exacerbates the salt deposit problem at the downstream passage end. It was found that a heating element alone solves the salt deposit problem occasionally and that only the combination of an outlet wall and a heating element solves the salt deposit problem in the outlet. In this way, the heat of the heating element spreads significantly better along the passage if the passage is simultaneously enclosed peripherally by an outlet wall at least along a section of the passage. Using the outlet wall, the heating element can maintain the temperature in the entire passage above the melting temperature of the salt of the molten salt so that operation of the apparatus need not be interrupted for maintenance work removing solidified salt. In this way, the object according to the invention of decreasing maintenance is fulfilled and in particular the operational availability of the apparatus is increased.

According to a most particularly preferred embodiment, the outlet is an outlet trough. The outlet trough is preferably made of metal, more preferably a steel sheet and most preferably a stainless-steel sheet. The outlet trough extends preferably between the wall opening of the heating chamber wall and the passage end. For practical purposes, the outlet trough is peripherally enclosed by the outlet wall at least partially and preferably entirely. It is advantageous if the outlet trough is inside the passage. For practical purposes, the outlet trough creates a fluidic connection for flow of the molten salt between the wall opening of the heating chamber wall of the heating chamber and the passage end or the cooling station. It is preferred that the outlet trough tapers downstream in the flow direction and toward the passage end. It is advantageous that the outlet trough be of curved cross-sectional shape.

It is very advantageous if the outlet is constructed such that a heated gas from the heating element can flow inside the passage and below the molten salt flowing in the passage. Preferably, the outlet is constructed such that there is a clearance or a empty space between a floor of the passage and the molten salt or a floor of the outlet trough. It is advantageous if a support element, for example out of sheet metal, is provided between the base of the passage and the floor of the outlet trough for creating the desired clearance or empty space. Preferably, a suspender is on the outlet trough and attached to a cover or lid of the outlet. For practical purposes, the support element is in a region allocated to a lower half of the outlet trough. It is preferred that the suspender is located in a region of the outlet for an upstream half of the outlet trough. It is very preferred that the outlet trough be positioned in the outlet or in the passage in such a manner that a gas heated by the heating element can flow around the outlet trough on all sides cross-sectionally along a section and preferably along the entire length of the outlet trough. It is understood that the expression "flow around on all sides along the entire length of the outlet trough" does not exclude suspension or support elements.

It is particularly preferred that the outlet or the passage or the passage end has a trap for preventing outside air from entering into the passage. Preferably, the trap is at the passage end. For practical purposes, the outlet wall comprises an opening into which the trap is inserted. The opening in the outlet wall is located preferably on a floor of the outlet. According to a particularly preferred embodiment, the trap is heatable and more preferably electrically heatable. Most preferably, the trap is electrically heated inductively. It is possible that the trap has electrical resistance heating. The trap comprises preferably an inlet region and an outlet region. For practical purposes, the inlet region of the trap is separated from the outlet region of the trap by a catchment tank for collecting molten salt.

Advantageously, the passage or the outlet trough or the trap are constructed such that the molten salt flows into the inlet region of the trap and thereby fills the collecting tank. For practical purposes, the collecting tank comprises on the outlet side an overflow wall so that the collecting tank can be filled with molten salt up to a level defined by the overflow wall. For practical purposes, the trap is constructed such that, when the molten salt spills over the overflow wall, it runs down along the overflow wall and preferably is then in freefall. The trap advantageously comprises a cover wall that together with the collecting tank or the molten salt located in the collecting tank separates the inlet region from the outlet region of the trap. The cover wall preferably has a lower edge that is lower than of the overflow wall. For practical purposes, the cover wall has an immersion section defined by the height of the upper edge of the overflow wall as well as a gas separation section lying over it. The overflow wall is attached at its lower end preferably to a base wall of the trap. For practical purposes, the trap has an outer wall that contacts edges of the outlet opening. For practical purposes, the base wall, the outer wall as well as the overflow wall form the collecting tank. Preferably, the outer wall encloses the cover wall and the overflow wall as well as the base wall.

It is possible that the cooling station is surrounded by a housing, and the outlet or the passage end is connected to the housing. Preferably, the outlet or the passage end is connected via a connection element, particularly via a down pipe, to the housing. It is preferred that the housing encloses the dispersion opening, the conveyor, the partition and/or the separation device. The housing is preferably below the outlet or passage end. The housing or the connection element is preferably designed to allow a negative pressure, generated for example by a blower in the heating chamber, in the cooling station.

According to a most particularly preferred embodiment, the outlet wall has a ceramic layer. For practical purposes, the ceramic layer has a thickness of at least 15 cm or 20 cm. It is possible that the ceramic layer has a maximum thickness of 40 cm or 35 cm or 30 cm. It is preferred that the ceramic layer forms an inner layer of the outlet wall. Preferably, the outlet wall comprises a metal outer layer that consists of steel for example. The metallic outer layer has a thickness for practical purposes of at least 3 mm/4 mm/5 mm and for practical purposes a maximum thickness of 12 mm/10 mm/8 mm. The ceramic layer of the outlet wall may be designed in a walled or integral manner. The ceramic layer is preferably designed for temperatures of at least 800° C./900° C./1000° C./1100° C.

It is preferred that the outlet or the passage end or the outlet trough has downwardly directed drop opening. The term "drop opening" refers in particular to the fact that from this opening onward the molten salt is no longer in contact with the outlet or the passage or the outlet trough and is simultaneously in freefall. It is preferred that a main section of the passage tapers on its inner side toward the drop opening. For practical purposes, the tapering occurs in both horizontal directions. It is possible that a down pipe is provided below the drop opening and advantageously comprises a metal. For practical purposes, the down pipe has on its lower end a flange for connecting to the housing of the cooling station.

Advantageously, the outlet is on a lateral heating chamber wall or an outer side of a lateral heating chamber wall of the heating chamber. It is advantageous if the outlet projects past the lateral heating chamber wall. For practical purposes, the outlet is attached to a lower end of the lateral heating chamber wall. It is within the scope of the invention that a floor of the heating chamber slopes downward toward the outlet. For practical purposes, the heating chamber or the floor of the heating chamber is connected for fluid flow via a wall opening in the lateral heating chamber wall to the outlet or the passage or the outlet trough. It is expedient if the wall opening is elevated relative to the floor of the heating chamber.

At least one air lock for maintaining a negative pressure in the cooling station can be allocated to the cooling station or its housing. It is preferred that the air lock is a rotary feeder. It is expedient that the cooling station or its housing is constructed such that preferably solid substances can be taken out via the air lock or locks from the cooling station. It lies within the scope of the invention that the housing of the cooling station is connected at least to one outlet air lock for the bulk material. It is preferred that a second outlet air lock is provided for clumps of solidified molten salt. It is preferred that the cooling station or its housing or the dispersion opening has a rotary feeder for introducing the bulk material into the housing or for dispersing on the conveyor.

Preferably, the outlet or a cover of the outlet has a removable lid. When the lid is installed, the lid covers in particular at least sectionally the main section or the drop opening of the passage end. When in fully in place, the lid covers for practical purposes a downstream section of the outlet trough. It is very preferred that one or more devices are provided on the lid. These devices may be for example inspection windows, heating elements, sensors or scrubbers. Preferably, the lid has a metallic outer layer that consists for example of steel and preferably steel sheet. It is preferred that the lid has a ceramic layer, preferably a ceramic inner layer. This ceramic inner layer of the lid may be designed in a walled or integral manner for example.

According to an advantageous embodiment, the outlet has at least one temperature sensor and preferably two temperature sensors. The at least one temperature sensor is preferably coupled to the heating element or the outlet burner so that the at least one temperature sensor and the heating element form a control loop. Preferably, the outlet has a wall temperature sensor for recording the temperature in the outlet wall and particularly at the floor of the outlet wall. It is preferred that the outlet has a passage temperature sensor for recording the temperature in the passage. For practical purposes, the outlet has a pressure sensor for determining the gas pressure in the passage. It is advantageous if the passage temperature sensor and/or the pressure sensor extend through the cover of the outlet.

It is within the scope of the invention that the outlet comprises a scrubber. The scrubber is preferably constructed such that the cleaning process is purely mechanical. It is preferred that the scrubber has a plunger designed for crushing or preventively avoiding salt deposits around the passage and particularly around the passage end. Preferably, the scrubber projects through the outlet wall and preferably through a cover of the outlet wall. It is advantageous if the scrubber is pointed toward the passage end. For practical purposes, the scrubber is motor-driven. Advantageously, the scrubber is designed to push in regular time intervals into the region of the passage end or the drop opening or an end of the outlet trough. Preferably, the scrubber is designed to detect mechanical resistance due to more viscous molten salt when pushing into the region of the passage end or the main region or the drop opening. For practical purposes, the scrubber is designed to push into the more viscous molten salt until the mechanical resistance is no longer detected.

It is advantageous that the outlet has at least one inspection window and preferably two inspection windows. It is preferred that the at least one inspection window be constructed such that the passage and particularly the passage end can be observed. The at least one inspection window is preferably on a cover of the outlet wall and preferably above the passage end. Preferably, the outlet comprises a second inspection window for observing a preferably middle region of the outlet trough. It is expedient that the second inspection window is on a cover of the outlet or the outlet wall. A third inspection window may be provided on one side of the down pipe for the purpose of observing the inside of the down pipe.

It is within the scope of the invention that the heating chamber has a heating chamber burner. The heating chamber burner or the inlet for introduction of the saline substance are oriented in such a manner that a jet of the saline substance is directed toward a burner flame of the heating chamber burner. The heating chamber burner is preferably constructed such that, particularly using combustible contents in the saline substance, a temperature of at least 600° C./700° C./800° C./900° C. is reached. For practical purposes, the heating chamber burner reaches a maximum temperature of 1600° C./1400° C./1200° C. It is preferred that the burner is on an upstream end of the heating chamber.

For practical purposes, the heating chamber has heating chamber walls. Preferably, the heating chamber or at least one or more of the heating chamber walls have wall tubes. The heating chamber walls or heating chamber wall or wall tubes are very preferably constructed such that these walls are at a temperature of 320° C./300° C./280° C. It is preferred that a temperature at the heating chamber wall or the heating chamber walls is at least 150° C./175° C. The wall tubes may be provided for example on an outer end of the heating chamber wall/walls or form the heating chamber wall/walls itself/themselves.

According to a very particularly preferred embodiment, the heating chamber comprises on the outlet side a blower for the purpose of suctioning gas or a gas mixture out of the heating chamber. Preferably, the blower or the apparatus or the heating chamber or the cooling station are constructed such that a negative pressure forms in the heating chamber or in the outlet or in the cooling station.

In a very preferred manner, a conveyor is provided below the passage end so that the molten salt can fall onto the conveyor. The conveyor is preferably part of the cooling station. For practical purposes, the conveyor determines a travel direction extending preferably at least generally horizontally. It is advantageous if a dispersion opening for sprinkling the conveyor with bulk material is provided upstream of the passage end and above the conveyor. For practical purposes, the apparatus or the dispersion opening or the conveyor is constructed such that the bulk material forms a bulk material bed on the conveyor. For practical purposes, the bulk material or the bulk material bed on the conveyor has a temperature such that the molten salt falling on the bulk material bed solidifies into clumps in the bulk material bed on the conveyor. Preferably, a clump-bulk material mixture output of the housing is provided, preferably with a rotary feeder upstream of the conveyor. Preferably a separator is provided downstream of the clump-bulk material mixture exit. The separator is preferably constructed such that the bulk material can be separated, at least partially and preferably to the greatest extent possible, from the clumps of solidified molten salt. It is preferred that below the conveyor, there is a bulk material collector, formed as for example a screw conveyor. It is possible that a return conveying section for return conveying the bulk material is provided between a downstream end of the bulk material collector and an inlet side of the dispersion opening. The return conveying section may be operated pneumatically for example. It is possible that the return conveying section has a cooler for the bulk material. Advantageously, the apparatus has a bulk material hopper for receiving the bulk material, the bulk material hopper preferably being connected on the output side to the dispersion opening. Preferably, an element for controlling with or without feedback a travel rate of the bulk material, preferably a rotary feeder, is provided between the bulk material hopper and the dispersion opening. The return conveying section is preferably provided between the bulk material collector or the housing on the one hand and the bulk material hopper on the other.

To attain the inventive object, the invention provides a method of extracting molten salt, particularly with a device according to the invention, where molten salt flows along a passage of an outlet all the way to a passage end of the outlet, and downstream of the passage end, the molten salt is cooled in a cooling station at least until solidifying, the outlet having a heating element that, preferably as needed and more preferably only when needed, supplies heat to the outlet or the passage to prevent salt deposits.

For practical purposes, the apparatus comprises a heating chamber. It is advantageous if the heating chamber has an inlet for introduction of a saline material. It is preferred that the passage is peripherally enclosed at least along one section of an outlet wall.

It is very preferred that the molten salt in the passage is guided along an outlet trough, and gas heated by the heating element flows around the outlet trough preferably along its entire length in a fully circumferential manner. It is advantageous if the outlet trough comprises a metal, preferably a steel and particularly preferred a stainless steel. Due to the good heat conductivity of metal, the heated gas flowing around the metal trough quickly heats the molten salt.

BRIEF DESCRIPTION OF THE DRAWING

The invention is further described below with reference to a drawing showing one embodiment. Therein:

FIG. 4 is a vertical cross section through the outlet from FIG. 1, and FIG. 5 is a top view of the outlet from FIGS. 1, 3 and 4.

SPECIFIC DESCRIPTION OF THE INVENTION

Figure 1:
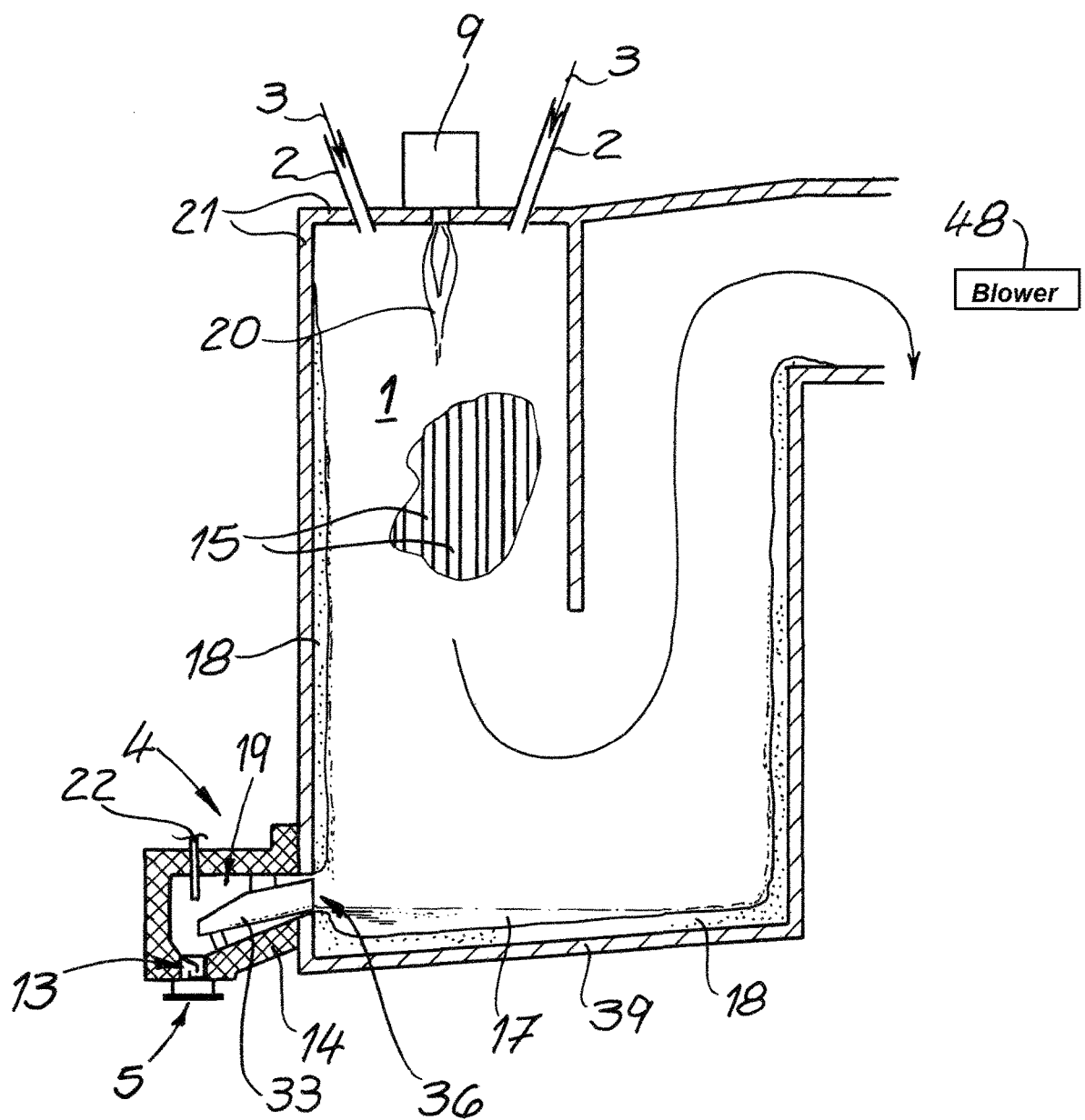
FIG. 1 is a vertical section through an upper part of a device according to the invention comprising a heating chamber with an outlet.

FIG. 1 shows a heating chamber 1 for purifying saline substances 3 in the form of industrial wastewater. Multiple inlets 2 inject the substance 3 into the heating chamber 1. The inlets 2 are oriented in such a manner that the saline substance 3 is directed toward a flame 20 of a burner 9. The saline substance 3 comprises water, salt, and a combustible components. The combustible components are burned by a burner flame 20, and the water content rapidly evaporates. Based on a temperature of over 800° C., the salt is liquefied and is entrained away as a saline mist by the water vapor due to the rapid vaporization of the water.

The heating chamber 1 has walls 21 having wall tubes 15 that are filled with water vapor and keep the heating chamber walls 21 at a temperature of 200 to 300° C. The salt hereby condenses and solidifies on the inner face of the heating chamber walls 21 so that a salt layer 18 forms. The salt layer 18 grows approximately 20 to 30 mm inward until the heat insulation of the salt layer 18 is so great that the surface of the salt layer 18 stays liquid. In this way, molten salt 17 flows continuously down the salt layer 18 and collects in a slightly sloping floor 39 of the heating chamber 1. On an outlet end of the heating chamber 1, there is an unillustrated blower that creates a slight negative pressure inside the heating chamber 1.

The molten salt 17 can drain out of the heating chamber 1 via an outlet 4 at an opening 36 in one of the heating-chamber walls 21. The outlet 4 has an outlet wall 14 that defines a passage 19 in the form of an empty space. Inside the passage 19, there is provided an outlet trough 33 that extends from the wall opening 36 to a downstream passage end 5 having a drop opening. The molten salt 17 flows from the wall opening 36 along the outlet trough 33 to the passage end 5 where there is a trap 13. The trap 13 prevents outside air from entering into the passage end 5, but simultaneously allows the molten salt 17 to exit. In this way, there is also a slight negative pressure in the outlet 4 as in the heating chamber 1 so that a continuous flow of air through the outlet 4 into the heating chamber 1 is prevented, and the probability of salt depositing there is prevented. After exiting the trap 13, the molten salt 17 then drops into a lower part of the apparatus.

Figure 2:
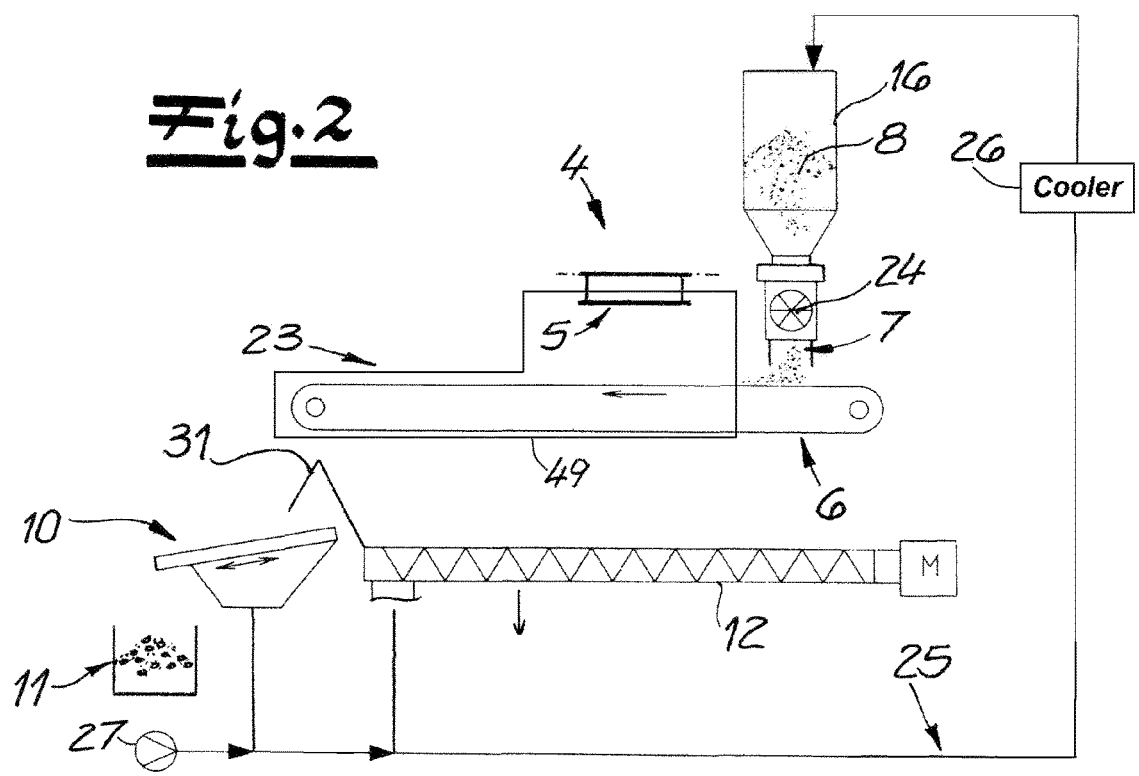
FIG. 2 is a schematic view of a lower part of the apparatus according to the invention.

FIG. 2 schematically shows the lower part of the apparatus for extracting molten salt. The middle region of the lower part is a cooling station 23 because the molten salt 17 is cooled to solidification inside a housing 49 of the cooling station 23. The cooling station 23 comprises primarily a conveyor 6. In FIG. 2, the outlet 4 is only shown partly above the conveyor 6. The conveyor 6 in the form of a continuous conveyor belt defines a travel direction that runs only horizontally in this embodiment. Upstream of the passage end 5, there is a dispersion opening 7 of a hopper 16 from which bulk material 8, for example sand, is strewn onto the conveyor 6. The flow rate of the bulk material 8 falling out is measured in such a manner that a bulk material bed of sufficient depth (10 cm for example) forms on the conveyor 6. To this end, the conveyor 6 has two unillustrated side walls that are stationary and limit spreading of the bulk material bed. The molten salt 17 then flowing or dropping underneath the passage end 5 onto the bulk material bed solidifies in the bulk material bed without reaching the base of the conveyor 6. The molten salt 17 solidified in the bulk material bed forms clumps of solidified molten salt within the bulk material bed.

In FIG. 2, one can also see that a bulk material collector 12 in the form of a screw conveyor provided underneath the conveyor 6 collects bulk material 8 trickling down from the conveyor 6 and this can then be conveyed from there as needed by a blower 27 via a pneumatic return conveying section 25 back to the bulk material hopper 16. Along the return conveying section 25, there is also a cooler 26 that cools down the bulk material to a working temperature as needed. The bulk material hopper 16 is connected on its lower output side to a rotary feeder 24 whose speed is controllable to adjustably set a travel rate of the bulk material 8. The rotary feeder 24 on the output-side end of the bulk material hopper 16 is at the dispersion opening 7 and therefore definitively determines the depth of the bulk material bed.

At the end of the conveyor 6, the clumps and the bulk material 8 fall into a separator 10. A partition 31 prevents the clumps from falling into the bulk material collector 12. The separator 10 of this embodiment is a slightly diagonally arranged vibrating trough having a floor sieve whose mesh size is such that the bulk material 8 but not the clumps of solidified molten salt fall through. On the left end of the separator 10, the clumps of solidified molten salt fall into a clump receptacle 11 that is for example a container or a big bag. By contrast, the bulk material 8 falling through the separator 10 is collected by a funnel and supplied to the return conveying section 25.

Figure 3:
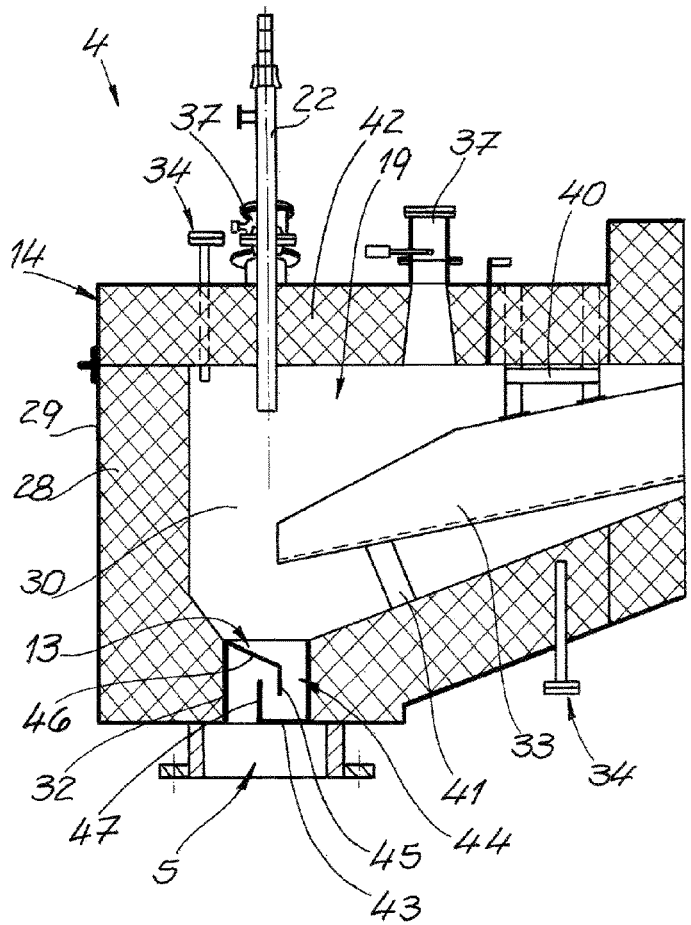
FIG. 3 is a vertical section in enlarged scale through the outlet of FIG. 1 according to the invention.

FIG. 3 is a large-scale view of a longitudinal cross-section of the outlet 4. Accordingly, the outlet wall 14 has a metallic outer layer 29 that consists preferably of steel sheet. Furthermore, the outlet wall 14 has a heat-resistant, ceramic inner layer 28 that is for example 25 cm thick. The outer layer 29 of steel sheet is for example 6 mm thick. The outlet trough 33 leads to a main section 30 of the outlet 4 that tapers downward. The outlet trough 33 is carried by a hanger 40 from a cover of the passage 19 and the outlet trough 33 as well as by a support 41 between a floor of the passage 19 and the outlet trough 33. The outlet trough 33 thus does not contact the floor of the passage 19. As a consequence, gas heated by the heating element 22 can flow around the outlet trough 33 on all sides. As a result, the risk of salt depositing thereon is decreased. In addition, the outlet trough 33 can be easily replaced if corrosion is excessive.

In FIG. 3, one can also see that the heating element 22 in the form of an outlet burner extends through the cover of outlet 4 and a nozzle of the outlet burner 22 is directed at the passage end 5. Likewise, a temperature sensor 34 extends through the cover of the outlet 4 so that the tip of the temperature sensor 34 projects into the passage 19 or into the main region 30. An additional temperature sensor 34 is located in a section of the outlet wall 14 below the outlet trough 33. This temperature sensor 34 does not extend through the outlet wall 14, so that the tip of this temperature sensor 34 records the temperature of the outlet wall 14 at the floor of the passage 19. The outlet 4 or the cover of the outlet 4 has a removable lid 42. The temperature sensor 34 extending through the cover of the outlet 4 as well as the heating element 22 are provided on the lid 42. In addition, two inspection windows 37 are located in the lid 42, the first inspection window 37 being directed at the passage end 5 and the second inspection window 37 at a middle section of the outlet trough 33.

FIG. 3 also shows the structure of the trap 13. The trap 13 is located in an opening on an underside of the outlet, and an outer wall 32 of the trap abuts an inner face of the opening of the outlet wall 14. A cover wall 44 is attached to an upper edge of the outer wall 32, and the cover wall 44 comprises a lower immersion section 45 as well as an upper gas separation section 46. On a lower edge of the outer wall 32, there is attached a base wall 43 from which an overflow wall 47 extends upward. An upper edge of the overflow wall 47 is higher than a lower edge of the cover wall 44 or the immersion section 45. The molten salt 17 flows along the outlet trough 33 and then falls on the gas separation section 46 of the cover wall 44. From there, it runs into a collecting tank of the trap, the sump defined by the outer wall 32, the base wall 43 and the overflow wall 47. The collecting tank of the trap fills with the molten salt 17 until the level of the molten salt 17 in the collecting tank has reached the upper edge of the overflow wall 47. Then the molten salt 17 runs down the overflow wall 47 on an outer side of the overflow wall 47 and falls from there downward onto the conveyor 6. Because the lower edge of the immersion section 45 lies lower than the upper edge of the overflow wall 47, and because the gas separation section 46 prevents gas or outside air from entering into the passage 19, the molten salt 17 passes out of the trap and outside air cannot flow back into the passage 19. To prevent salt deposits in the trap 13, the trap 13 is electrically heated by an unillustrated induction heater.

FIG. 4 shows the outlet 4 of FIG. 3 in cross section with the view direction of this cross-section being directed away from the heating chamber walls 21. In this profile, the heating element 22 is also pointed toward the passage end 5 so that the heating element 22 passes in an approximately perpendicular manner through the ceiling of the outlet 4 or the lid 42 based on the arrangement of the heating element directly above the passage end 5. Furthermore, in this cross-section one can see a mechanical scrubber 35 located next to the heating element 22 and also pointed at the passage end 5 that results in a diagonal arrangement compared to the heating element 22. The scrubber 35 is designed as a motor-driven plunger that can prevent viscous molten salt 17 from solidifying around the passage end 5. In addition, the scrubber 35 is able to detect light mechanical resistance caused by viscous molten salt 17. For example, once an hour the scrubber 35 extends into the passage end 5. In the event of resistance, the scrubber 35 pushes again until the resistance dissipates. The scrubber 35 can thereby be assisted by the heating element 22.

Provided diametrically opposite the scrubber 35, one can better see in FIG. 4 a first inspection window 37 that allows one to see the passage end 5 or the end of the outlet trough 33. Accordingly, one can detect salt deposits or viscous molten salt and observe the activities of the heating element 22 and/or the scrubber 35. Furthermore, this drawing illustrates that the outlet trough 33 is designed with a curved cross-section. In addition, besides the temperature sensor 34, one can also see a pressure sensor 38 that also extends through the cover of the outlet 4 or the lid 42 and is thus able to record the gas pressure in the passage 19. In FIG. 4, one can also see the trap 13. The view hereby falls on the cover wall 44 with the immersion section 45 and the gas separation section 46. In addition, the upper edge of the overflow wall 47 is indicated with a dashed line because the cover wall 44 covers it.

Last, FIG. 5 shows the outlet 4 in a top view. One can readily see in this drawing how the heating element 22, the scrubber 35, the first and second inspection windows 37, the temperature sensor 34 as well as the pressure sensor 38 are positioned to one another on the lid 42. Furthermore, one can see that the outlet trough 33 tapers toward the passage end 5 and that the trap 13 of this embodiment is of circular cross-section. The overflow wall 47 and the immersion section 45 of the cover wall 44 are indicated with dashed lines.

The invention claimed is:

1. An apparatus for extracting molten salt from a saline solution, the apparatus comprising:
   tube walls forming a heating chamber for heating the solution sufficiently to melt salt therein and having an inlet receiving the saline solution and an outlet for the molten salt, the outlet having a passage defined by an outlet wall and having a passage end from which the molten salt exits the chamber;
   a cooling station for receiving the molten salt from the outlet and then cooling and solidifying the molten salt; and
   a heating element in the outlet.

2. The apparatus according to claim 1, wherein the outlet has a trough.

3. The apparatus according to claim 1, wherein the outlet is constructed such that a gas heated by and emanating from the heating element can flow inside the passage and below the molten salt in the passage.

4. The apparatus according to claim 1, wherein an outlet end of the passage has a trap for preventing outside air from entering into the passage.

5. The apparatus according to claim 1, wherein an inner wall of the outlet has a ceramic layer.

6. The apparatus according to claim 1, wherein the passage end opens downward.

7. The apparatus according to claim 1, wherein the outlet is on a lateral wall of the heating chamber.

8. The apparatus according to claim 1, wherein the outlet has at least one inspection window.

9. The apparatus according to claim 1, wherein the outlet has a removable lid.

10. The apparatus according to claim 1, wherein the outlet has at least one temperature sensor.

11. The apparatus according to claim 1, further comprising:
    a scrubber in the outlet.

12. The apparatus according to claim 1, further comprising:
    a conveyor in the cooling station below the passage end positioned such that the molten salt can fall onto the conveyor from the passage end.

13. A method of extracting molten salt with the apparatus according to claim 1 from a saline solution, the method comprising the steps of:
    heating the heating chamber to vaporize the saline solution and melt the salt therein;
    flowing the molten salt from the heating chamber along a passage of an outlet until reaching an end of the outlet;
    heating walls of the outlet to prevent solidification of the molten salt therein; and
    cooling the molten salt downstream of the passage end in a cooling station at least until solidified.

14. The method according to claim 13, further comprising the steps of:
- guiding the molten salt in the passage along an outlet trough, and
- heating a gas with the heating element and flowing the heated gas flow around the outlet trough in its complete periphery at least along a portion of the trough.

15. The method according to claim 13, further comprising the step of:
- cooling walls of the chamber such that at least some of the fused salt in the chamber solidifies as a layer on the walls.

* * * * *